United States Patent [19]

Kerekes

[11] Patent Number: 4,546,290
[45] Date of Patent: Oct. 8, 1985

[54] BALLAST CIRCUITS FOR DISCHARGE LAMP

[75] Inventor: Béla Kerekes, Budapest, Hungary

[73] Assignee: Egyesult Izzolampa es Villamossagi Rt., Budapest, Hungary

[21] Appl. No.: 610,918

[22] Filed: May 15, 1984

Related U.S. Application Data

[63] Continuation of Ser. No. 372,344, Apr. 27, 1982, abandoned.

[30] Foreign Application Priority Data

May 8, 1981 [HU] Hungary .................. 1226/81

[51] Int. Cl.[4] ............................................ H05B 37/02
[52] U.S. Cl. .................. 315/209 R; 315/287; 315/302
[58] Field of Search ............... 315/209 R, 287, 302

[56] References Cited

U.S. PATENT DOCUMENTS

| | | | |
|---|---|---|---|
| 3,265,930 | 8/1966 | Powell | 315/307 |
| 3,275,922 | 9/1966 | Meyer et al. | 315/200 |
| 3,753,071 | 8/1973 | Engel et al. | 363/37 |
| 3,919,592 | 11/1975 | Gray | 315/DIG. 4 |
| 4,163,176 | 7/1979 | Cohen et al. | 315/62 |
| 4,170,747 | 10/1979 | Holmes | 315/307 |
| 4,275,335 | 6/1981 | Ishida | 315/209 R |
| 4,353,007 | 10/1982 | Moerkens | 315/58 |
| 4,375,607 | 3/1983 | Morton et al. | 315/62 |
| 4,412,154 | 10/1983 | Klein | 315/287 |

OTHER PUBLICATIONS

"New Parameters for High Frequency Lighting Systems", by John H. Campbell, Illuminating Engineering, May 1960, p. 247.

Primary Examiner—Harold Dixon
Attorney, Agent, or Firm—Gabriel P. Katona

[57] ABSTRACT

A high frequency ballast circuit for a discharge lamp particularly of the so-called energy saving type adapted to fit into conventional incandescent lamp sockets. The circuit comprises an inductive choke and a transistor switching device connected in series with the lamp and a rectified source of AC supply. The transistor is switched with a high frequency, preferably asymmetrically square, waveform and a diode having a direction of conduction opposite to that of the transistor is connected in shunt across the series-connected choke and lamp. The circuit enables lightweight air core coils to be used for the inductive choke facilitating integral combination of the circuit and discharge lamp into a lamp unit having the same general configuration as a conventional incandescent lamp.

8 Claims, 3 Drawing Figures

BALLAST CIRCUITS FOR DISCHARGE LAMP

This is a continuation of application Ser. No. 372,344, filed on Apr. 27, 1982, now abandoned.

The invention concerns a circuit arrangement for a high frequency ballast system for limiting the operating current of a lamp unit, especially an energy-saving lamp unit, which can without adaptation be screwed into sockets for incandescent lamps and which lamp unit incorporates an electric discharge lamp, expediently a fluorescent tube, a high pressure sodium lamp or a metal halide lamp. The invention furthermore extends to discharge lamps formed with the use of said high frequency ballast unit which lamp is asymmetric as regards its electrodes.

It is known that the current of an electric discharge lamp must be limited by means of a series-connected resistance to a value appropriate for the output of the lamp. This current limiting is performed by the ballast unit of the discharge lamp. The ballast unit causes energy losses. One must strive to minimize this energy loss. The most frequently utilized ballast unit for the AC supply of a discharge lamp is an iron-core choking coil which, being an impedance, limits the current. Although the energy accumulated in the magnetic field of the ballast unit is significant, this does not cause any problem because this energy is regenerated both in the positive and negative half-periods. The geometrical dimensions and weight of the iron-core ballast unit does not cause any problems either since the ballast unit can be disposed in the lamp body, in other words in the shell which incorporates the cap of the discharge lamp, the mirrors, the protective glass etc. and there is enough room next to these for the ballast unit also.

In the case where it is desired to utilize a discharge lamp in place of an incandescent lamp of poor efficiency to save energy or other economic reasons, and moreover so that the discharge lamp should be screwable into the existing socket without adapting the circuitry, totally different conditions must be taken into account in the design of ballast unit. Above all, the circumstance that the circuitry of an incandescent lamp does not contain a current-limiting device while at the same time the geometrical dimensions of the envelope and cap of a conventional incandescent lamp make the construction of the ballast unit much more difficult. Here the geometrical dimensions as well as the weight of the ballast unit become a significant question and moreover aesthetic considerations and shape design factors also come to the fore. If the ballast unit is large, then possibly the lamp unit cannot be accommodated into a fitting which previously contained the incandescent lamp.

To satisfy the above-outlined requirement a solution is known wherein the discharge lamp is operated from a high frequency generator instead of the 50 or 60 Hz mains supply. In this case naturally the high frequency generator must also be built together with the ballast unit and the discharge lamp. The use of high frequency has the advantage that the geometrical dimensions of the inductive ballast may be smaller since, as is well-known, the impedance of an inductive coil increases in a linearly proportional manner with an increase in frequency. By 'high frequency' is meant here the range of 1 kHz–100 kHz, because under 1 kHz the advantages of high frequency do not show up significantly, while above 100 kHz radiation problems arise. The operation of discharge lamps at high frequency is in practice a generally employed solution. Its advantage is that, for instance, by increasing the frequency the efficiency of the lamps is improved, etc. Hence primarily for reasons of energy-saving it is customary to operate, e.g., 8–10 lamps from one common generator provided with the well-known iron-core transformer. In this case the method of fitting the ballast unit is conventional, i.e. it is disposed in the fitting; a decrease of the geometrical dimensions is not a primary task although the dimensions of the ballast unit are naturally smaller because of the high frequency.

The circuit arrangements of high frequency ballast units of discharge lamps may be characterized in that the flow of energy between the current supply and the discharge lamp via the ballast unit is bidirectional. As has already been mentioned, the economy of the inductive ballast unit lies in that when the instantaneous value of the mains voltage is increasing the ballast unit takes up energy and stores it in its magnetic field, and when the voltage is decreasing this energy is regenerated.

In discharge lamps another significant factor is the rate of the energy regeneration, i.e. its course with time. The rate of energy regeneration is a function of the self-inductance of the ballast unit and of the voltage at the terminals of the lamp (in other words, of the operating voltage or lamp voltage). A designer chooses these values in such a way that by the time that the energy of the coil is exhausted, i.e. the lamp current reduces to zero and thus the lamp is extinguished, the instantaneous value of the mains voltage is sufficiently large to be able to re-ignite the lamp. Put in other words, this circumstance means that the phase difference between the lamp current and the mains voltage should be as large as possible because this makes the re-ignition of the lamp at the end of the period all the more reliable.

The re-ignition voltage required is the greater, the greater the vapor pressure of the discharge lamp. If one now considers that by the increasing the pressure the optical parameters, e.g. the color rendition, etc. of the lamp can be improved, then it can be understood that one should strive to maximize the phase difference accordingly. For this purpose, however, the largest possible self-induction is required and accordingly the geometrical dimensions also increase.

In the case of high frequency operation one needs above all a power amplifier, which in the case of known circuits is constituted by a power oscillator operating as a high frequency generator. High frequency generators operated on DC only, hence the mains supply must be rectified. The interpolation of a rectifier has the consequence, however, that as regards the possibilities of energy flow the bidirectional connection between the mains supply as the main energy source and the discharge lamp ceases. The required bidirectional connection is restored in the known solutions by means of a transformer, i.e. it is regenerated locally, as it were. This transformer is the output transformer of the power oscillator in the primary coil of which always unidirectional current flows (generally as the collector current of a transistor) although its amplitude oscillates with the high frequency; however, in its secondary coil, which supplies the discharge lamp via the ballast unit the voltage is a genuine alternating voltage. Thus in the secondary circuit there may come about a disturbance-free bidirectional energy connection between the mains supply (the secondary coil) and the discharge lamp via the ballast unit. The energy fed into the leakage (stray) inductivity of the transformer is however lost even in this way. Such a high frequency ballast system is employed in the combination lamp constructed according to U.S. Pat. No. 4,170,744 which consists of a discharge tube and incandescent filament disposed in a common envelope and formed with a conventional shell, the ballast of the discharge as well as a high frequency generator being connected to the envelope. This lamp belongs in the category of the so-called energy-saving light sources, in other words it is suitable for use in place of a conventional incandescent lamp without changing the circuitry or other adaptation; and as a consequence the weight and geometrical dimensions of the ballast system are particularly important. The circuit arrangement of the generator, ballast and discharge tube of the lamp according to the invention is conventional and its ballast is of the iron (ferrite) core transformer type wherein in a known manner the secondary coil provides the function of the ballast while the primary circuit is loosely coupled (leakage transformer).

The compact fluorescent lamp developed by the firm Toshiba and marketed under the name Neo Ball is also constructed with a conventional ballast system and is so formed that it has spherical envelope provided with a normal E 26 base and the envelope includes the U-shaped fluorescent tube as well as a part of the ballast system.

Both lamps have the disadvantage that the transformer included in the ballast system requires quite a lot of space and causes a disproportionately large weight load.

An aim of the present invention is to eliminate these disadvantages and to form a ballast system enabling the realization of a simpler, easier and smaller energy-saving lamp, and moreover in such a manner that the re-ignition voltage should be increasable over a wider range whereby with certain high pressure discharge lamps the advantages attendant on the use of higher vapor pressures are also assured.

Another aim furthermore is the simplification and improvement of the economy of the manufacture of the ballast and thus of the energy-saving lamp, above all by obviating the use of the iron-core; as well as the construction of discharge tubes which are asymmetric as regards the electrodes.

The discovery which lead to the development of the invention is that if to the input of the switching transistor connected in series in a circuit of the discharge lamp there is connected a control circuit producing high frequency asymmetrically timed square waves, preferably with the section consisting of the discharge lamp and the choke coil connected directly together being shunted by a diode in such a way that its forward direction (direction of conduction) is opposite to that of the switching transistor, then the above-described aims may be realized in full and a ballast system can be formed which is more advantageously usable for the energy-saving lamp unit, and furthermore hitherto unachieved discharge lamps of an asymmetric electrode system, such as high pressure sodium lamps, may be produced.

The above aims are solved according to the invention so that the circuit of the discharge lamp includes, in addition to the partially or fully transformed or possibly non-transformed choke coil, a further series connection of a rectifier and a switching transistor, in certain preferred embodiments the discharge lamp and the choke coil placed next to each other are shunted by a second rectifier the forward direction of which is opposed to that of the series-connected rectifier as regards the mains supply. The current of the discharge lamp is interrupted or chopped in a pulsed manner by controlling the switching transistor with an asymmetric square wave. The transistor control may be by external excitation or self-excitation. The time-course of the control depends according to the invention on the self-inductance of the ballast employed as well as on the output of the discharge lamp and its operating voltage in accordance with the norm described below. Optionally the rectified voltage of the main supply can be smoothed by a capacitor. The dimensions of the capacitor are controlled on the basis of the above-discussed re-ignition requirement.

The arrangement and operation of the high frequency ballast system according to the invention is illustrated in the following drawings.

Figures 1, 2:
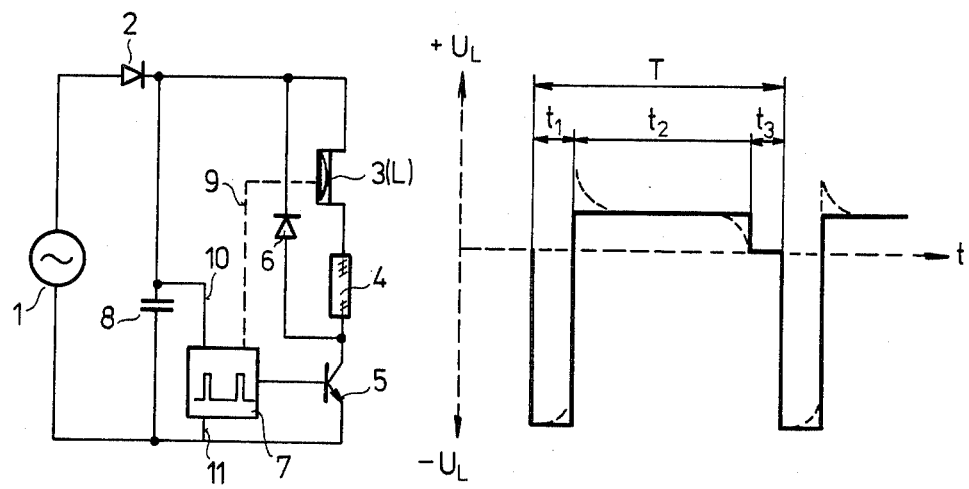
FIG. 1 is a circuit diagram of one possible embodiment of the ballast system according to the invention.
FIG. 2 is a graph of the variation of the voltage appearing at the terminals of the choke as a function of time.

In FIG. 1 the main circuit 1 consists of a mains rectifier 2 connected to the mains supply, a choke coil 3, a discharge lamp 4 and a switching transistor 5. The choke coil 3 and the discharge lamp 4 are shunted by a diode 6 the direction of conduction of which is opposite to that of the rectifier 2, as regards the mains voltage.

A control unit 7 is connected to the base of the transistor 5 which unit produces square waves and turns the transistor on and off. This control unit may be a free-running oscillator but it may also receive control from the main circuit in such a manner that it forms an oscillator together with it. This possibility is illustrated by the feed-back line 9. The feed-back may also be applied to the switching transistor but these variations do not have any significance from the point of view of the invention. The rectified voltage is smoothed by a capacitor 8 which, however, has a role in the achievement of the already discussed re-ignition voltage, and if there is a control unit it also feeds that control unit via lines 10 and 11.

The operation of the circuit is as follows:

When the control unit 7 turns the switching transistor 5 on, the rectified voltage of the mains is applied to the discharge lamp 4 and ignites it. This mode of ignition is very favorable since the capacitor 8 stores almost the peak value of the mains voltage which is available in any phase of the period, in contrast to the conventional mode of switching or to a high frequency transformer construction in which latter, as we saw, the re-ignition voltage had to be assured by phase shifting and even then at the price of making compromises.

Let the current of the discharge lamp 4 start at zero. Later on the conditions of start-up will be discussed again. The diode 6 is not yet conducting because the voltage across the choke coil 3 and the discharge lamp 4 biases it in a reverse or backward direction. Thus the rectified voltage is divided over three elements 3–5.

The voltage drop at the terminals of the switching transistor 5 is, independently of the value of the current, less than 1 Volt which can be totally neglected in the case of a mains voltage in excess of 100–200 volts. Because of the known characteristics of an arc discharge the voltage at the terminals of the discharge lamp 4 is in practice independent of the current and is thus constant.

The lamp voltage depends on the vapor pressure of the discharge space. On the first switch-on, when the discharge lamp 4 is completely cold, i.e. its vapor pressure is very small, the lamp voltage is 20–30 volts and after a warm-up of about 5 minutes reaches about one-half of the mains voltage, i.e. in the case of a mains voltage of 220 volts approximately 90–100 volts.

Hence at the terminals of the ballast the voltage also becomes constant which during the switch-on time is less than the mains voltage by the operating voltage of the lamp. The rise in current is determined by this voltage difference and the self-inductance of the choke coil 3 according to the following known correlation:

$$i = \frac{U - U_1}{L} \cdot t$$

wherein:
i = the current of the discharge lamp
U = rectified voltage of the mains
$U_1$ = operating voltage of the discharge lamp
t = time elapsed since switch-on
L = self-inductance of the ballast.

The switching transistor 5 is advantageously kept turned on (conductive) until the current reaches double the mean current, calculated as a fraction of the output and operating voltage, given that the lamp voltage is constant while the mean current is one-half the peak value of the linearly increasing current.

The peak current to be achieved is therefore:

$$I_{max} = \frac{2P}{U_1}$$

wherein P is the output of the lamp.

At the instant of turning the transistor off, the voltage at the terminals of the choke coil 3 is changed to the opposite sense, whereby the diode 6 is turned on and thus the voltage originating from the disappearing magnetic field passes directly to the terminals of the discharge lamp 4. Since the lamp voltage is constant, independently of the current, the thus achieved peak current begins to decrease, again linearly, according to the following relation:

$$i = I_{max} - \frac{U_1}{L} \cdot t$$

wherein t is the time elapsed since switching-off.

During this time the electromagnetic energy stored in the ballast is transferred to the discharge lamp 4.

In designing the circuit according to the invention one should advantageously strive to ensure that the energy of the choke coil 3 should be completely exhausted, i.e. that during the switching-off period the current should decrease to zero. Given knowledge of the self-inductance, the time required for this can be calculated from the above relation. Namely, if the current of the diode 6 does not decrease to zero by the time the switching transistor 5 is turned on again, the excess current deriving from the overlap can damage the diode and the switching transistor 5 also.

FIG. 2 shows the variation of the voltage appearing at the terminals of the choke coil 3 as a function of time and within that also illustrates the course of the switching-off and switching-on. In this Figure $t_1$ is the time of switching-on, $t_2$ is the time of decay or discharge of the current and $t_3$ is a safety period required to extinguish the 'on' state of the diode 6 having regard to the tolerance or leakage of the components, especially the backward recovery time of the diode 6. The waveform in continuous lines is shown on the basis of the above analysis for the ideal case where the lamp voltage is truly constant and independent of the current. In reality of ignition and extinction the characteristics somewhat deviates from this. The effect of this, approximating reality more closely, is illustrated by the broken line, but from the point of view of the invention this has no significance.

Figure 3:
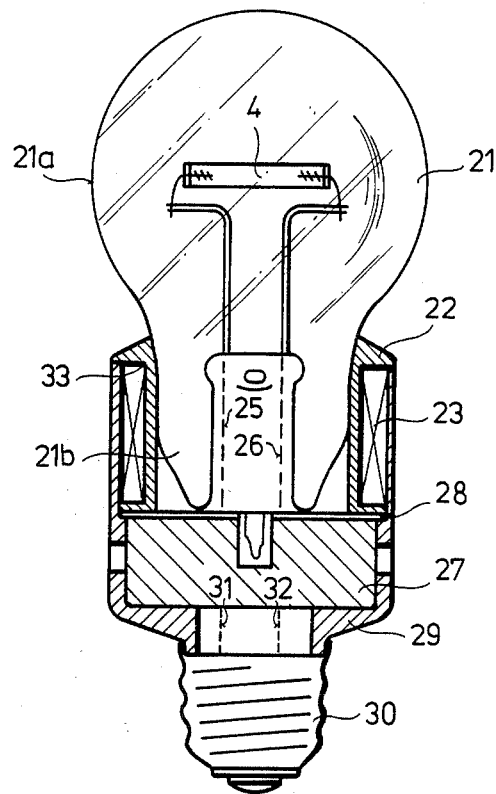
FIG. 3 shows the use of a possible embodiment of the ballast unit according to the invention in an energy-saving lamp unit.

FIG. 3 shows the use of a mode of construction of a lamp provided with a ballast system according to the invention. The neck of the energy-saving lamp 21 has a spool body 22 which contains the ballast coil 23 in the case of the present invention an air-core multilayer solenoid coil. The envelope 21a of the energy-saving lamp conforms with the dimensions and shape of a conventional incandescent lamp but contains a discharge tube 4 in place of an incandescent filament. The lead-in conductors 25, 26 of the discharge tube 4 are connected to an electronic unit 27 disposed under the neck 21b which contains the other elements of the ballast system described in FIG. 1. The choke coil 3 and the electronic unit 27 connected to it as well as the screening plate 28 placed between these two units are accommodated by a protecting sleeve 29 to which is secured the threaded base 30 of the energy-saving lamp 21. The ballast system is supplied with current by conductors 31, 32 passing out from the base 30. Adhesive material 33 secures the unit containing the whole ballast system to the envelope 21a of the energy-saving lamp 21.

In calculating the main parameters of the ballast system one starts from the mains voltage, more particularly from the rectified voltage U, the output of the lamp P, the operating voltage of the lamp $U_2$, and the self-conductance L of the ballast coil. The task is the determination of the switching-on time $t_1$, the switching-off time $t_2$ and the safety time $t_3$. The sum of these three times is the period T the inverse of which is the high frequency f in question.

With this method of designing the primacy of the impedance coil against the frequency is to be emphasized, since in harmony with the main aim of the invention the dimensions, weight, construction and disposition of the ballast coil, as the biggest component, is determinant in the construction and economy of the energy-saving lamp units, expediently discharge lamps, aiming to replace incandescent lamps.

The use of 'air-core' multi-layer solenoid type coils according to the invention is particularly advantageous because it is the cheapest, lightest and its disposition is aesthetically pleasing while scarcely increasing the original dimensions of the incandescent lamp. However, it is disadvantageous that in relation to the iron-core coils the same self-inductance value can only be achieved at a higher volume but this is balanced by its hollow shape whereby it may e.g. be placed on or around the neck of the lamp and thus occupies only such space as is of no value. Its decreased inductivity is also balanced primarily by the circuit arrangement according to the present invention.

According to our experience for a 20–50 W energy-saving high pressure discharge lamp with a screw-in (Edison) type lamp unit the shape e.g. as shown in FIG. 3 may be designed while achieving 1–3 mH.

In connection with the determination of the safety time $t_3$ we have so far only mentioned the protection of the switching transistor 5. However, the circuit arrangement according to the invention provides wide possibilities in addition, in particular by significant increase of the safety time to enable the optical parameters of certain high pressure discharge lamps to be increased also.

It is known, for instance, that the efficiency of a high pressure sodium vapor lamp can also be increased for the same output by increasing the current. In known circuitry, in which the mean current of the lamp and its peak current are always related in the same sense, this possibility can only be exploited by choosing the operating voltage of the lamp to be as small as possible. This is accompanied by an increase in the self-inductance and thus in the geometrical dimensions and weight of the ballast as well as an increase in the reactive current. However, with our circuit arrangement, by increasing the safety time with the same mean current, higher peak currents can be provided. For instance, if the safety current is the same as the sum of the conductance time and the non-conductance time, then the peak current is not twice the mean current but its fourfold value. Thus in the determination of the operating mode of the lamp decisions may also be made on the basis of such and similar considerations. Thus our statements relating to the safety time $t_3$ expediently precedes the determination of the conductance or switching-on time $t_1$ and the non-conductance or switching-off time $t_2$.

By way of example, let us calculate the time parameters of the operation of a 35 W high pressure sodium vapor lamp utilizing the ballast system according to the invention, with the following characteristics:

| | |
|---|---|
| Mains voltage | 220 V |
| Rectified voltage | $U$ = 230 V |
| Power | $P$ = 35 W |
| Operating voltage | $U_1$ = 70 V |
| Self-inductance of choke | $L$ = 2.2 mH |
| Safety time | $t_3$ = 0.0 s |

Since the safety time is zero the peak current $$I_{max} = \frac{2 \times P}{U_1} = \frac{2 \times 35}{70} = 1 A$$

The switching-on and switching-off times on the basis of formulae 1 and 3:
Switching-on time:

$$t_1 = \frac{I_{max} \times L}{U - U_1} = \frac{1 \times 2.2 \times 10^{-3}}{230 - 70} = 0.0137 \times 10^{-3} s$$

Switching-off time:

$$t_2 = \frac{I_{max} \times L}{U_1} = \frac{1 \times 2.2 \times 10^{-3}}{70} = 0.0314 \times 10^{-3} s$$

Safety time = 0.0 s
Period $T = t_1 + t_2 + t_3 = 0.0451 \times 10^{-3}$ s
Frequency: $F = (1/T) = 22172$ Hz Even if the safety time is chosen to be so large as to be of the same order of magnitude as the switching-on and switching-off times, then first the peak current is determined in particular by simple area calculation on the current-time diagram, since the lamp voltage is constant. Thereafter the calculation is performed in conformity with the above description.

Discharge lamps can be made and operated by using the ballast system according to the invention wherein the electrodes are not alike, i.e. one is formed solely as a cathode while the other is formed solely as an anode. A fluorescent tube, high pressure sodium vapour lamp, or metal halide lamp which is asymmetric from this point of view nevertheless deviates from the known and conventional lamps and belongs to the scope of the present invention.

I claim:

1. A high frequency ballast circuit for limiting the operating current of a discharge lamp, the circuit comprising a choke coil and a switching transistor connected in series with the discharge lamp therebetween and a diode shunt connected across the choke and the lamp with the forward direction of the diode being opposite to that of the switching transistor and a control circuit receptive of rectified line voltage for producing a 1-100 kHz frequency square wave of asymmetric periodicity and applying same to the input of the switching transistor, wherein the period of the square wave is greater than the time during which current is supplied to the discharge lamp which is the sum of the switching-on time $t_1$ and the switching-off time $t_2$.

2. The circuit according to claim 1, wherein the switching-on time of the switching transistor is less than one-half the period of the square wave.

3. The circuit according to claim 1, wherein the choke coil is of an air-core construction.

4. A discharge lamp unit comprising the circuit according to claim 1, wherein the electrodes are asymmetrical, with only solely a cathode and the other solely an anode.

5. A high frequency ballast circuit for an electric discharge lamp, the circuit comprising an inductive coil and an electronic switching device for connection in series with the discharge lamp and a source of current supply and means for alternately switching the switching device on and off to provide high frequency operation during which current is supplied to the discharge lamp from the current supply during conduction of the switching device and from the inductive coil during nonconduction of the switching device and wherein the period of the high frequency operation is greater than the time during which current is supplied to the discharge lamp.

6. The circuit according to claim 5, further comprising a rectifier connected in series with the inductive coil, discharge lamp and switching device to provide unidirectional current flow to the circuit from the current source.

7. The circuit according to claim 6, further comprising a second rectifier connected in series with the electronic switch and the first rectifier and as a shunt across the inductive coil and discharge lamp, the two rectifiers having opposite directions of conduction with respect to the current source.

8. A lamp unit comprising a conventional incandescent lamp cap structure, a miniature discharge tube sealed within an outer vitreous envelope and the circuit according to claim 5 connected to the discharge tube and affixed to the envelope.

\* \* \* \* \*